(12) United States Patent
Chen et al.

(10) Patent No.: US 8,200,063 B2
(45) Date of Patent: Jun. 12, 2012

(54) SYSTEM AND METHOD FOR VIDEO SUMMARIZATION

(75) Inventors: Francine Chen, Menlo Park, CA (US); Matthew Cooper, San Francisco, CA (US); John Adcock, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1296 days.

(21) Appl. No.: 11/860,436

(22) Filed: Sep. 24, 2007

(65) Prior Publication Data

US 2009/0080853 A1   Mar. 26, 2009

(51) Int. Cl.
*H04N 9/80* (2006.01)

(52) U.S. Cl. ........................................ 386/242; 386/239

(58) Field of Classification Search .................. None
See application file for complete search history.

(56) References Cited

U.S. PATENT DOCUMENTS

2003/0016945 A1* 1/2003 Nakamura ........................ 386/46
2006/0193387 A1* 8/2006 Wu et al. ................... 375/240.16
2008/0306995 A1* 12/2008 Newell et al. .............. 707/104.1

OTHER PUBLICATIONS

Bouget, Jean-Yves, "Pyramidal Implementation of the lucas kanade feature tracker.description of the algorithm" Technical report, Intel Corp. Microprocessor Research Lab, 2000.
Cooper, M. et al., "Scene boundary detection via video self-similarity analysis" in Proc. IEEE International Conference on Image Processing (ICIP), pp. 378-381, 2001.
Divakaran, A. et al., "Video mining: Pattern discovery versus pattern recognition" In Proc. IEEE Int'l Conference on Image Processing (ICIP), vol. 4, pp. 2379-2382, Oct. 2004.
Divakaran, A. et al., " Video Mining, chapter Video Summarization Using MPEG-7 Motion Activity and Audio Descriptors" Kluwer Academic Publishers, 2003.
Duan, L.-Y. et al., "Shot-level camera motion estimation based on a parametric model" In Proc. TRECVID 2005, 2005. http://www.nlpir.nist.gov/projects/tvpubs/tv5.papers/I2R.pdf.
Gunsel, B., et al., "Temporal video segmentation using unsupervised clustering and semantic object tracking". Journal of Electronic Imaging, 7:592-604, Jul. 1998.
Hofmann, Thomas. Unsupervised learning by probabilistic latent semantic analysis. Mach. Learn., 42 (1-2): 177-196, 2001.

(Continued)

*Primary Examiner* — William C Vaughn, Jr.
*Assistant Examiner* — Asher Khan
(74) *Attorney, Agent, or Firm* — Sughrue Mion, PLLC

(57) ABSTRACT

The subject invention relates to a system and method for video summarization, and more specifically to a system for segmenting and classifying data from a video in order to create a summary video that preserves and summarizes relevant content. In one embodiment, the system first extracts appearance, motion, and audio features from a video in order to create video segments corresponding to the extracted features. The video segments are then classified as dynamic or static depending on the appearance-based and motion-based features extracted from each video segment. The classified video segments are then grouped into clusters to eliminate redundant content. Select video segments from each cluster are selected as summary segments, and the summary segments are compiled to form a summary video. The parameters for any of the steps in the summarization of the video can be altered so that a user can adapt the system to any type of video, although the system is designed to summarize unstructured videos where the content is unknown. In another aspect, audio features can also be used to further summarize video with certain audio properties.

22 Claims, 4 Drawing Sheets

OTHER PUBLICATIONS

Kramer, P. et al., Camera motion detection in the rough indexing paradigm. In Proc. TRECVID 2005, 2005. http://nlpir.nist.gov/projects/tvpubs/tv5.papers/-labri.pdf.

Lucas, B.D. et al., "An Interative image registration technique with an application to stereo vision" In IJCAI81, pp. 674-679, 1981.

Nam, J. et al., Dynamic video summarization and visualization. In proceedings of the seventh ACM international conference on Multimedia, vol. 2, pp. 53-56, 1999.

Ng, A., et al., On Spectral clustering: Analysis and an algorithm. In Advances in Neural Information Processing Systems 14: Proceedings of the 2001., 2001.

Ngo, C.W., et al., Automatic video summarization by graph modeling In Proc. Ninth IEEE International Conference on Computer Vision (ICCV'03), vol. 1, p. 104, 2003.

Odobez, J.-M. et al., Video Shot clustering using spectral methods In Int. Workshop on Content-based Multimedia Indexing (CBMI), 2003.

Open source computer vision library. http://www.intel.com/technology/computing/opencv/.

Peyrard, N. et al., "Motion-based selection of relevant video segments for video summarization". In Multimedia Tools and Applications, vol. 26, pp. 259-227, 2005.

Tseng. Belle, et al., "Video Summarization and personalization for pervasive mobile devices" In Proc. SPIE Electronic Imaging 2002—Storage and Retrieval for Media Databases, 2002.

Uchihashi, Shingo, et al., "Summarizing video using a shot importance measure and a frame-packing algorithm" In Proc. IEEE ICASSP, vol. 6, pp. 3041-3044, 1999.

Yahiaoui, Itheri, et al., "Automatic video summarization".

\* cited by examiner

SYSTEM AND METHOD FOR VIDEO SUMMARIZATION

BACKGROUND OF THE INVENTION

1. Field of the Invention

The subject invention relates to a system and method for video summarization, and more specifically to a system for segmenting and classifying data from a video in order to create a summary video.

2. History

Video cameras are becoming more prevalent as they become more inexpensive and are embedded in different technologies, including cell phones and digital cameras. As evidenced by the popularity of posting videos on the Internet, it has become easy for people to create and publish videos. With the increasing amount of video available, there is a corresponding increasing amount of unstructured video, that which hasn't been reviewed or classified. When a user needs to classify a large amount of video that is unknown or unstructured, the process of classifying the video is time-consuming. The user could simply manually view all the videos, but it takes time to load and watch each video in real time.

Additionally, raw video footage contains more footage than is desirable in the final viewing or for assessing the content in the video. This may take on the form of "bad shots" or too much of a scene with no action. Looking through a video to quickly assess whether it contains a shot of interest or covers a topic of interest is tedious. If the shot of interest is short, it may be missed if scrubbing the video is used, as the user may scrub quickly over what appears to be redundant video. Actions due to object movement or camera movement may also be missed when scrubbing too quickly.

There are a number of video summary systems that have been described in the literature.

In "Dynamic video summarization and visualization," *Proceedings of the seventh ACM international conference on Multimedia*, J. Nam and A. H. Twefik, vol. 2, pages 53-56, 1999, Nam and Twefik describe creating extractive video summaries using adaptive nonlinear sampling and audio analysis to identify "two semantically meaningful events; emotional dialogue and violent featured action" to include in a summary. Their method is limited to specific types of videos and would not be appropriate to other genres, such as the majority of documentaries or educational videos.

Video summarization methods are also described in A. Divakaran, K. A. Peker, S. F. Chang, R. Radharkishnan, and L. Xie, "Video mining: Pattern discovery versus pattern recognition," in *Proc. IEEE International Conference on Image Processing (ICIP)*, volume 4, pages 2379-2382, October 2004, and A. Divakaran, K. A. Peker, R. Radharkishnan, Z. Xiong, and R. Cabasson, *Video Mining*, Chapter Video Summarization Using MPEG-7 Motion Activity and Audio Descriptors. Kluwer Academic Publishers, 2003. These methods are genre dependent and not generally applicable to a variety of videos, such as travel videos where the amount of activity does not vary widely and the speech may be primarily a narration.

In Shingo Uchihashi and Jonathan Foote, "Summarizing video using a shot importance measure and a frame-packing algorithm," in *Proc. IEEE ICASSP*, volume 6, pages 3041-3044, 1999, Uchihashi and Foote describe a method of measuring shot importance for creating video summaries. They do not analyze videos for camera motion, and so identification of shot repetition may not work well, as the similarity of repeated shots with camera motion is generally less than shots with a static camera.

IBM's Video Sue, by Belle Tseng, Ching-Yng Lin, and John R. Smith, "Video summarization and personalization for pervasive mobile devices," in *Proc. SPIE Electronic Imaging 2002—Storage and Retrieval for Media Databases*, 2002, is a summarization system that is part of a video semantic summarization system. However, their methods either require user annotation or use a single sub-sampling rate to trivially create a summary without accounting for varying content.

In N. Peyrard and P. Bouthemy, "Motion-based selection of relevant video segments for video summarization," *Multimedia Tools and Applications*, volume 26, pages 259-275, 2005, Peyrard and Bouthemy present a method for motion-based video segmentation and segment classification, for use in video summarization. However, the classifications are defined to match the video genre of ice skating. Thus Peyrard and Bouthemy are also limited to specific types of videos and are focused on the motion of objects.

In C. W. Ngo, Y. F. Ma, and H. J. Zhang, "Automatic video summarization by graph modeling," *Proc. Ninth IEEE International Conference on Computer Vision (ICCV '03)*, volume 1, page 104, 2003, Ngo et al. use a temporal graph that expresses the temporal relationship among clusters of shots. This method was developed for video where the shots are generally recorded in sequence, as in produced videos like a cartoon, commercial, or home video. The method assumes that each of the clusters can be grouped into scenes. It does not handle repetition of a scene, with intervening scenes. It also does not handle scenes with camera motion separately from those where the camera is static.

Finally, in Itheri Yahiaoui, Bernard Merialdo, and Benoit Huet, "Automatic Video Summarization, Multimedia Content-Based Indexing and Retrieval Workshop (MMCBIR)," 2001, Yahiaoui et al. present a method for frame-based summarization. Their method is limited to color-based analysis of individual video frames. Additionally, the method is computationally expensive because all frames are clustered.

Therefore, what is needed is a system for summarizing a video that can review a video, classify the content, and summarize the video while still preserving the relevant content.

SUMMARY OF THE INVENTION

The subject invention relates to a system and method for video summarization, and more specifically to a system for segmenting and classifying data from a video in order to create a summary video that preserves and summarizes relevant content. In one embodiment, the system first extracts appearance, motion, and audio features from a video in order to create video segments corresponding to the extracted features. The video segments are then classified as dynamic or static depending on the appearance-based and motion-based features extracted from each video segment. The classified video segments are then grouped into clusters to eliminate redundant content. Select video segments from each cluster are selected as summary segments, and the summary segments are compiled to form a summary video. The parameters for any of the steps in the summarization of the video can be altered so that a user can adapt the system to any type of video, although the system is designed to summarize unstructured videos where the content is unknown. In another aspect, audio features can also be used to further summarize video with certain audio properties.

In one aspect, a system for summarizing a video comprises: receiving an input video signal; extracting a plurality of features from the video, wherein separating the video into segments based upon the plurality of features; wherein each segment is separated based on one of the plurality of features;

classifying the video segments based upon the plurality of features; grouping similarly classified video segments into clusters; selecting a plurality of segments from the clusters to comprise summary segments; and compiling the summary segments into a summary video.

In another aspect, the plurality of features extracted is based on motion and appearance. The appearance features are a color histogram for each frame of a video segment, and the motion feature includes the type of camera motion in a video segment. In one aspect, the type of camera motion is a camera pan or a camera zoom.

In a further aspect, the plurality of features extracted includes features derived from the audio. The audio features extracted are used to separate the video into video segments based on sound.

In still another aspect, the motion and appearance features extracted are used to separate the video into segments that have similar appearance features and motion features. The separation of video into segments based on appearance features and the separation of video into segments based on motion features is carried out separately.

In another aspect, the video segments are classified as dynamic video segments, static video segments, or ignored video segments. The classifying of video segments includes combining the segments separated based on appearance features and the segments separated based on motion features. The dynamic video segments and static video segments are grouped into clusters separately, and in one embodiment, the dynamic video segments are grouped into clusters using both appearance features and motion features. The grouping of dynamic video segments into clusters includes dimension reduction and spectral clustering. The static video segments are grouped into clusters using appearance features. The grouping of static video segments into clusters uses agglomerative clustering.

In a further aspect of the system, a similarity matrix is calculated for all video segments in the clusters. The selecting of a plurality of video segments from the clusters to comprise summary segments is calculated based on the similarity matrix. In one aspect, one video segment per cluster is selected to comprise the summary segments.

In a still further embodiment, the summary segments are compiled in order by the beginning time of each segment, such that the summary video is in temporal order.

In yet another aspect, the summary video further includes information displayed to a user regarding the summary segments.

In one aspect of the invention, a system for summarizing a video comprises: receiving an input signal of a video; extracting a plurality of features from the video, wherein the features include motion and appearance; creating video segments based on the motion and appearance features; classifying the video segments based upon the plurality of features, wherein the video segments are classified as dynamic video segments, static video segments, or ignore video segments; grouping similarly classified video segments into clusters, wherein the dynamic video segments and static video segments are clustered separately; selecting a plurality of segments from the clusters to comprise summary segments, wherein one video segment from each cluster is selected; and compiling the summary segments into a summary video, wherein the summary video also includes data relating to the selected summary segments in relation to the video.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION OF THE INVENTION

In one aspect of the invention, the system provides a particular benefit when summarizing unstructured videos, such as large catalogs of video with unknown content. Some components of the system were developed specifically for one embodiment set forth in further detail below, such as a clapboard detector, but the general structure of the system can be applied more generally to summarizing other types of unstructured data.

In one aspect, the summarization system performs a number of functions that help a user to quickly assess the breadth of scenes in a video. The system removes redundant shots, allows weighting of scenes with and without camera motion, provides selection of summary shot segments based on amount of motion within a scene, and presentation of metadata with the shot to provide the context of the shots.

In one aspect, the system selects short extracts of video segments, trying to identify non-redundant segments that have action in them. The action may be due to objects moving in the video or the camera panning or zooming across a scene. The system also attempts to remove non-interesting segments, which include color bars, blue screens, clapboards, and objects such as hands, arms, or backs that accidentally cover up the camera lens.

Figure 1:
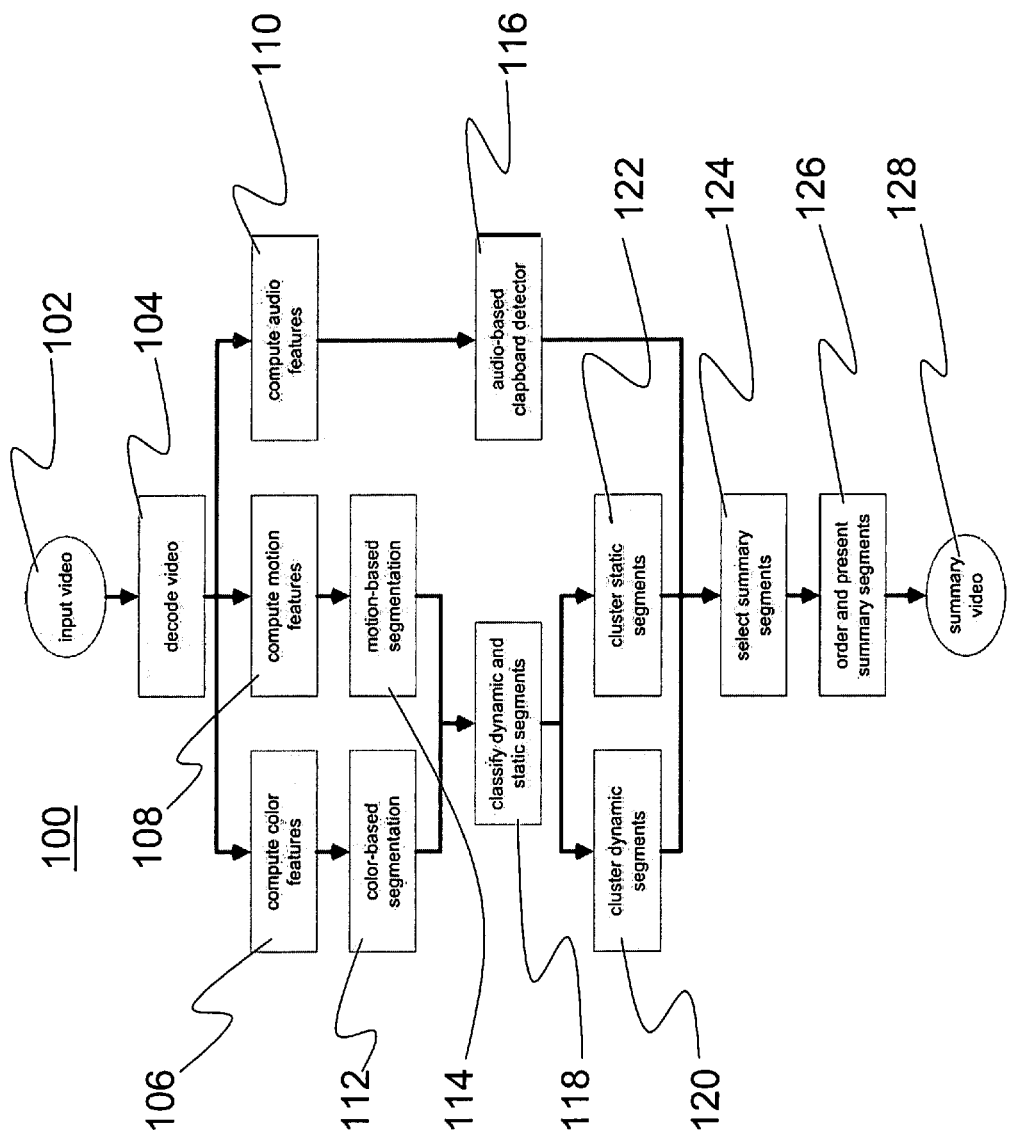
FIG. 1 is a block diagram illustrating the video summarization system of one aspect of the invention.

FIG. 1 is an overview of a video summarization system 100 according to one aspect of the present invention, beginning with the input of a video signal (stage 102). The video is input into the system as a compressed video signal and is then decoded for processing (stage 104). The input video may be encoded in any of numerous video compression formats, including, in one non-limiting example, MPEG-1. The decoding makes each frame of the video available to the ensuing processing as uncompressed raw color image data. The input video signal may also include audio as well. In this embodiment, the three types of features computed from the decoded input video signal are: color (stage 106), image motion (stage 108), and audio (stage 110). The color and motion features are used to segment the input video (stage 112, stage 114, respectively), and the segments are then classified (stage 118) as dynamic camera motion, static camera, or ignore, based on the motion features and color-based features. The dynamic and static segments are clustered separately to identify redundancies (stage 120, stage 122, respectively). In one aspect, audio features are used to identify the "clap" sound of a clapboard (stage 116), and segments in which an audio clap is identified are processed to remove the clapboard during summary segment selection (stage 124). Also during summary segment selection, if the summary is too short, a default summary mode is used instead. Finally, the summary segments are ordered (stage 126) and used to create a summary video (stage 128) with metadata to help the user better understand the summary.

1. Features

In one aspect of the video summarization system, three types of features are extracted from the video. These features capture appearance information, such as color, motion from the video, and sound level from the audio signal. The video-based features will be used for segmenting the video into segments that have similar color and motion. The video-based features are also used for classification of segments by type of camera motion, to help identify segments to ignore, such as color bars, and for identifying similar segments. The audio-based feature, in the embodiment described herein, is used to identify clapboards where there is a "clap" sound.

1.1 Color Features

To determine color features, simple color histogram features per frame are extracted. For each frame, three channel color histograms in the YUV color-space are extracted. Both global image histograms and block histograms using a uniform 4×4 spatial grid are extracted. Denote the frame indexed color feature vectors $X^{(C)} = \{X_n^{(C)}: n=1, \ldots, N\}$ for N frames. For all subsequent processing, consider $X_n^{(C)}$ to be the concatenation of the complete per-frame global and block histogram data.

1.2 Motion Features

Motion-based features are extracted (stage 108) for each frame of the videos using point-based tracking algorithms. One skilled in the art will appreciate that other image processing systems can be implemented here. Candidate point locations to track are chosen in one frame based on measures of local image contrast according to widely known methods. Candidate points are chosen subject to an overall limit on the number of points returned, a threshold on the suitability of the point for tracking, and a minimum required distance between points. One side effect of the suitability constraint is that the number of candidate points found varies greatly with image content, with more highly textured images being allocated more points. Once starting points are chosen in one frame their locations are determined in the subsequent frame by finding the region in the second frame that best matches the region around the point in the first frame. Those versed in the art will appreciate that the described point-choosing and inter-frame tracking is widely practiced in various implementations. For each point that is successfully tracked, the vector corresponding to its displacement between frames is computed. That is, for candidate point location number k in the first frame, $P_k = (x_k, y_k)$, and its estimated position in the second frame, $p'_k = (x'_k, y'_k)$, the motion vector is computed, $m_k = (x_k - x'_k, y_k - y'_k)$. Points that cannot be successfully matched between frames are simply ignored.

Figure 2:
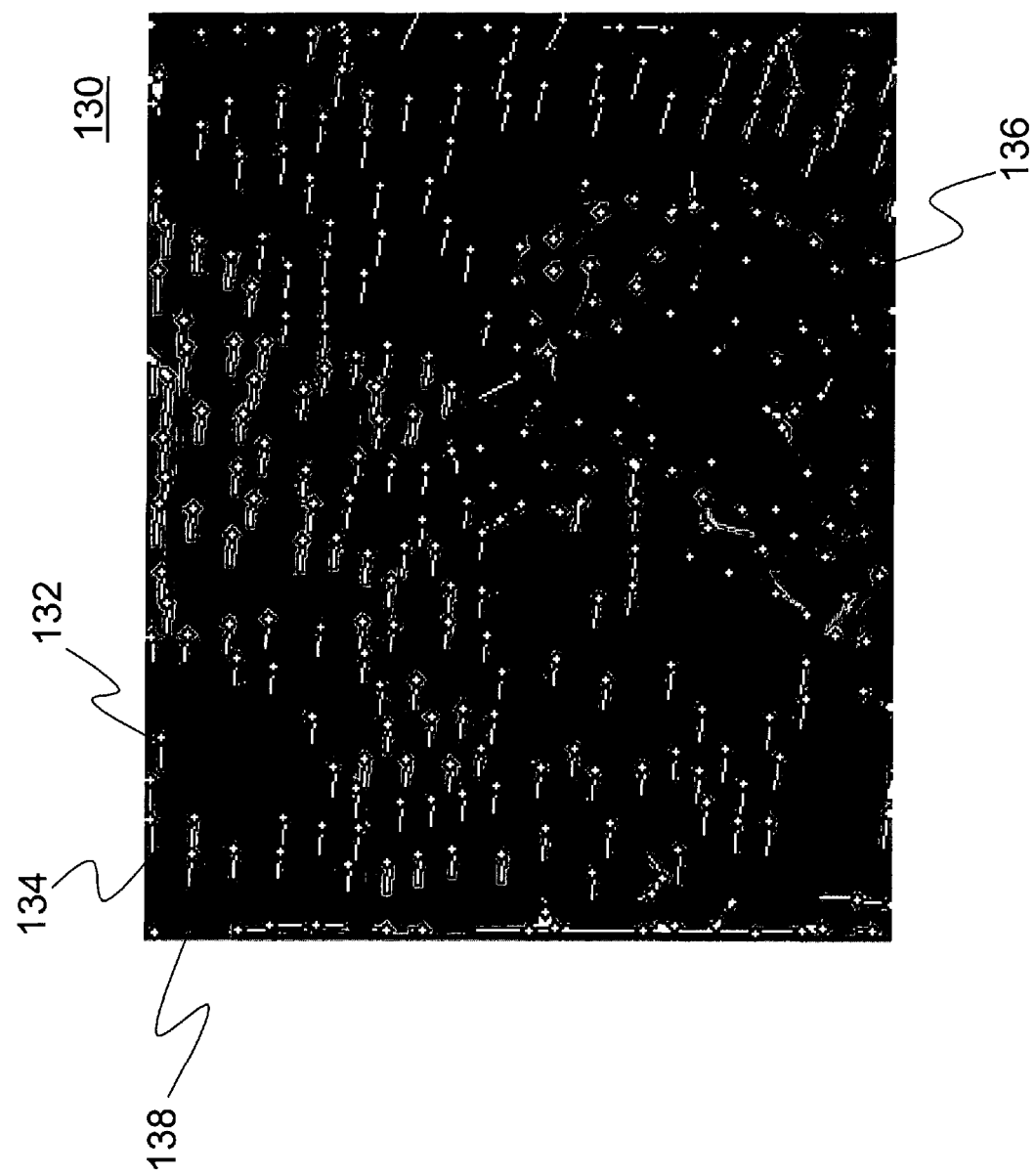
FIG. 2 is a video frame illustrating one method of computing a motion-based feature, in accordance with one aspect of the invention.

FIG. 2 illustrates a video frame 130 showing tracked locations 132 with trails 134 indicating the inter-frame motion. The points on the bicyclist 136 show little motion while the background 138 shows the systematic image shift due to a right to left pan.

The result of the motion tracking is a collection of motion vectors. In one aspect of the invention, the magnitudes of the motion vectors are summarized in a non-linearly spaced histogram with 14 bins. To capture directional information, the average angle of the vectors falling within each bin is also computed. This yields a pair of vector quantities: the magnitude histogram, and the vector containing the average direction of the motion vectors in each histogram bin. In one embodiment, the boundaries of the magnitude histogram were manually chosen as follows (in units of pixels): 0.0, 0.5, 1.0, 1.5, 2.0, 3.0, 4.0, 5.0, 6.0, 8.0, 10.0, 12.0, 15.0, 18.0, inf.

To capture camera motion, such as camera pans and zooms, the motion vectors are ordered by magnitude, and the 75% with the highest magnitudes are thrown out. The resulting low-magnitude vectors are averaged together and the x and y components of this average displacement are reported, along with the variance among the x and y components. To capture zoom information, the radial component (the vector projected onto the line joining the first point and the center of the image) of each motion vector is computed and the mean and variance of this projection included in the feature vector. The final resulting motion-based feature vector contains 1+6+14+14=35 elements.

1.3 Audio Features

To extract the audio features (stage 110), in one aspect of the invention, short-term audio energy is measured for each video. The original audio is extracted and converted to a monophonic, 16 kHz pcm signal, high-pass filtered at 4 kHz with a 3rd order Butterworth filter, and the log energy of the filtered audio is computed on 5 ms windows. This representation is used later to help identify audible occurrences of clapboards, although one skilled in the art will appreciate that a variety of sounds can be classified.

2. Segmentation

Once the features have been extracted, the video is separated into segments based upon the plurality of features. Segmentation based on color (stage 112) and segmentation based on motion (stage 114) are carried out separately. The color-based segmentation identifies boundaries where there are strong changes in the color distribution of the video frames. The motion-based segmentation identifies segments where motion characteristic of pans or zooms occur, and also color bars, which usually have very little motion.

2.1 Color-Based Segmentation

In one aspect, visual segmentation is based on the use of pair-wise inter-frame similarity features and kernel correlation to create a frame-indexed novelty score whose local maxima are good candidate shot boundaries. The basic system is documented in U.S. Pat. No. 6,542,869, to Foote, incorporated herein by reference, and has three main components: the first is the low-level feature extraction described previously herein with regard to extraction of the color-based features. This produces the frame-indexed set of feature vectors $X^{(C)}$. The second component is the generation of an incomplete inter-frame similarity matrix. For a maximal lag L=36 frames, a lag domain distance matrix is computed of the form:

$$S(i, l) = S(i, i-l) = D_X(X_i^{(C)}, X_{i-l}^{(C)}) = \frac{1}{2} \sum_b \frac{(X_i^{(C)}(b) - X_{i-l}^{(C)}(b))^2}{X_i^{(C)}(b) + X_{i-l}^{(C)}(b)}.$$

Here, b indexes the elements (bins) for the histogram features in $X_n^{(C)}$, the vector of color features for the $n^{th}$ frame. Because $D_X$ is symmetric and $S(n, n)=0$, only a small portion of the full N×N distance matrix is computed.

The final piece of the segmentation system is kernel correlation. In this process, a small square kernel matrix, K, representing the ideal appearance of an abrupt shot boundary is calculated. The kernel is then correlated along the main diagonal of S such that the center of the kernel is overlaid on elements $S(i, i)$ for all $i=1, \ldots, N$. This kernel resembles a checkerboard, so that elements comparing frames from different shots are weighted positively, while elements comparing frames from the same shot are weighted negatively. The correlation is a simple linear correlation or matched filtering operation:

$$v(n) = \sum_{l=-L}^{L-1} \sum_{m=-L}^{L-1} K(l, m) S(n+l, n+m).$$

The kernel is also transformed to a lag domain representation to expedite processing. Throughout, L=36. Once the correlation or novelty score is computed for each frame, simple peak detection is applied using a threshold and analysis of the first difference of v. Additional peak post-processing using segment duration constraints is also possible, as one skilled in the art will appreciate.

2.2 Motion-Based Segmentation

In one aspect of the invention, the motion-based segmentation component identifies segments of video where camera motion occurs. Pans in the x direction and y direction and zooms are identified separately. The union of the x-pans and y-pans are then combined into pan segments. All the motion features are smoothed before analysis begins.

The amount of camera motion often varies during a pan or zoom, starting and ending more slowly. Therefore, a threshold representing the minimum amount of motion required for a pan or zoom to occur is used to identify candidate pans and zooms. For each region where the motion value is greater than a threshold, the endpoints of the region are identified as the first locations forward and backward from the high motion region that are less than a selected threshold. The threshold is computed as the running average within a window of 2000 frames. The use of a running average helps in cases where the camera is more shaky than usual. The motion segments are scored as the trimmed average of the absolute value of the amount of motion in the segment.

In one aspect of the invention, color bar segments are identified by finding regions where there are very few motion points and very little global motion. Specifically, the magnitude of global motion in the x and y direction is computed, and a threshold on the number of motion points is used to identify candidate color bar segments. Thresholds on the peak motion values and the average motion value in each segment are used to remove segments with too much global motion.

To capture more detailed actions for a summary, optional additional processing can be performed to segment periods of local motion in static segments. This would help to differentiate times when a person is standing and talking versus, say, walking into a room or pouring a drink. One skilled in the art will appreciate that a variety of parameters can be used to capture various levels of motion.

3. Audio Detection

In one embodiment, clapboards are a common appearance in production videos, but generally undesirable in a video summary. The appearance of a clapboard is often accompanied by the audible impulsive 'clap' when the clapboard is closed (thus the term "clapboard"). This impulsive sound is fairly distinct from most of the typical audio found in the videos, and simple analysis of a history of the short-time log energy of the audio signal (see discussion of extraction of audio features, above) can detect many of the clapboard instances.

Figure 3:
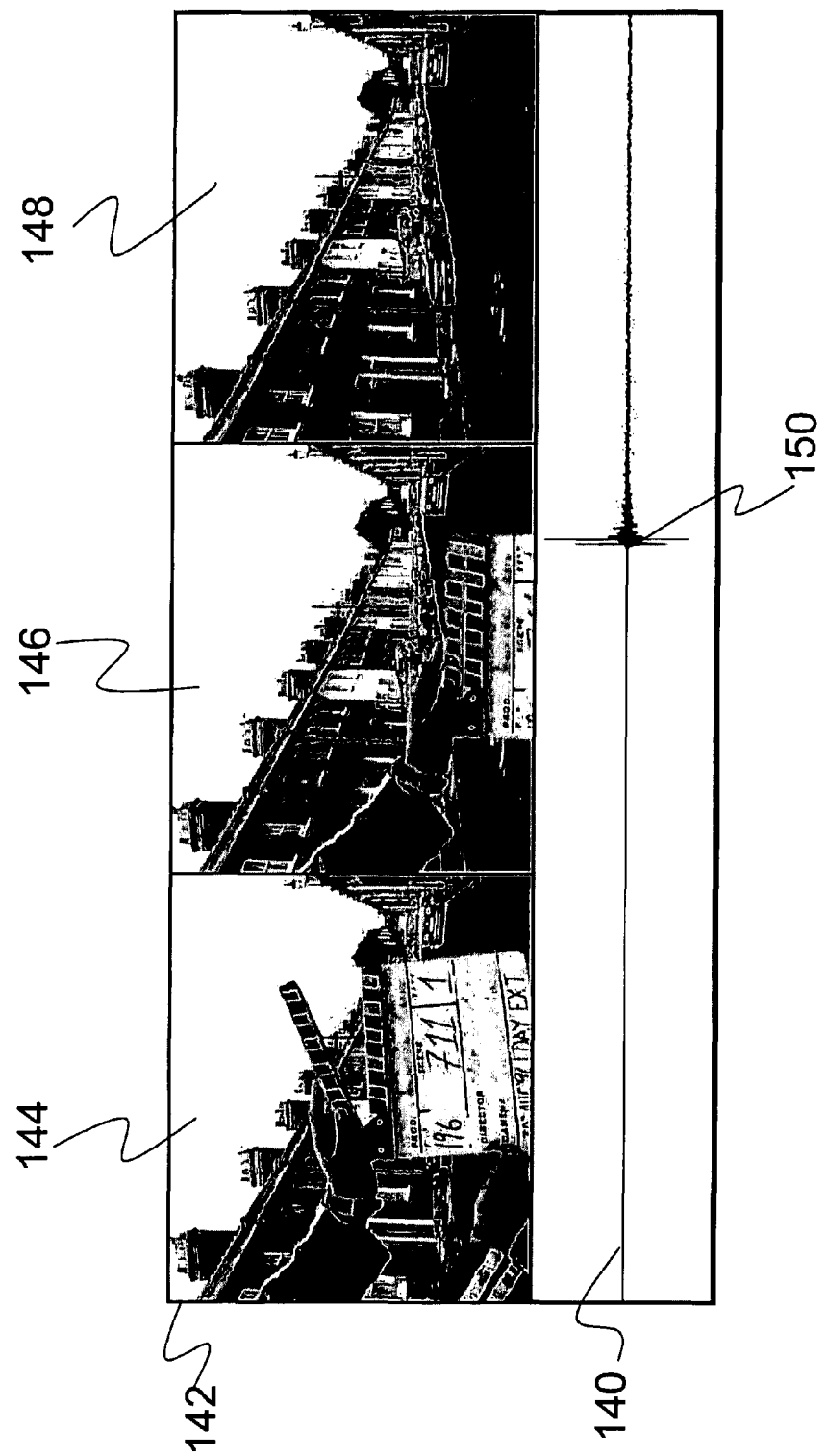
FIG. 3 is a series of video frames with a corresponding audio waveform that illustrates an audio-based clapboard detector, in accordance with one aspect of the invention.

FIG. 3 illustrates the audio waveform 140 from a clapboard appearance in correlation with a video segment 142. First frame 144, middle frame 146, and final frame 148 from a 1.3 second segment are shown over the audio waveform 140. The impulsive nature of the clap sound 150 is apparent with the middle frame 146.

In practice, the parameters of the clapboard detector were determined through trial and error, but could easily be determined automatically through various methods, including gradient search or grid search of the detection parameters. Likewise, the log energy features or other features such as mel-scale cepstra could be used as input to any number of machine learning systems such as support vector machines or neural networks to learn a detection rule.

The nature of this audio-based detector is such that it cannot distinguish between clapboards and other sounds with impulsive onsets (car slams, hammers, silverware clinking). Its tendency to false-alarm is highly dependent on the material being analyzed. However, due to the great degree of redundancy in the source material used in this embodiment, the penalty for an occasional false alarm was quite low. One skilled in the art will appreciate that the audio detection methods can necessarily be tailored and automated.

The described audio-based detector is attractive in its low computational complexity, but a visual clapboard detector is quite practical given the highly similar and somewhat distinctive appearance of most clapboards. An object detection system (such as the well known Viola-Jones detector) could be trained with positive and negative examples of clapboards. Compared to the audio-based detector, this would be orders of magnitude more computationally expensive, but could yield better results (for instance when there is no sound) either on its own or fused with the audio detection.

4. Segment Classification

The color-based and motion segmentations are used to classify and identify two types of segments as candidates to be represented in a summary (stage 118). In one embodiment of the invention, the two segment types are those containing camera motion, or dynamic video segments, and those segments where the camera is relatively steady, or static video segments. A third class of segments that are excluded from the summary, ignored video segments, is also created.

In one aspect, the classification of segments begins by first combining the segments produced by the color-based and motion-based segmentation steps. The motion-based segments are filtered to remove those that are unlikely to be suitable for inclusion in a summary. These include segments that are very short (in one embodiment, a 20 frame minimum is used) and those for which the motion features indicate that the motion was very fast. The fast motion is usually caused by the camera being switched on or off, or else by the camera being quickly moved to focus on another object. Segments identified as color bars are classified as ignored video segments and removed from consideration. The remaining motion-based segments are labeled as dynamic segments. Static segments are identified as those segments which are not motion-based segments or color bars.

The motion-based segmentation may miss some boundaries because adjacent shots may both contain similar motion. To address this issue, the color-based segments are combined with the motion-based segments. The color-based segments identify frames that generally correspond to shot boundaries. Whenever a shot boundary occurs within a dynamic segment or a static segment, the segment is split into two segments at the boundary. If the boundary creates a segment that is too short, then the shot boundary is trusted and the short segment is removed from consideration.

5. Clustering Segments

Once classified, the segments are grouped into clusters. Clustering of the segments is used to remove redundant shots (segments). As an alternative, a threshold could be set on the minimum distance between shots to classify them as the same, but the similarity between shots varied quite a bit among the videos used in this embodiment.

In one embodiment, dynamic segments and static segments are differentiated and clustered separately. The static segments tend to be much more similar to each other because the background is relatively stable, in contrast to the dynamic segments, which have a changing background. Thus, different features may be used in the clustering of dynamic segments.

Because of the different characteristics of the shots with camera movement and the shots where the camera was relatively steady, different features and clustering methods were employed. In this aspect, the dynamic segments are clustered using both color features and motion features, and the static segments are clustered are clustered based on color features only.

5.1 Dynamic Segment Clustering

The dynamic clustering process takes as input the dynamic segment boundaries, and the color and motion features extracted per frame. The dynamic clustering process includes two main components: dimension reduction and spectral clustering.

For dimension reduction, probabilistic latent semantic analysis (PLSA) is used, a technique originally used in text document categorization and indexing, and demonstrated in U.S. Pat. No. 6,687,696, to Hoffmann, et al., incorporated herein by reference. This is an unsupervised technique that uses expectation-maximization (EM) to estimate a low dimensional latent variable distribution from high dimensional multivariate data. This approach is applied separately to the color and motion features. For the histogram (count) data, each histogram per-channel and per-block are normalized to sum to one. Using the motion segmentation boundaries, the normalized counts are then accumulated over the entire segment. The same normalization and accumulation processes are applied separately to the motion feature histogram data. In this manner, the motion segments are used analogously to the text documents in the original usage context for PLSA.

Given vectors for each motion segment, PLSA uses EM to learn a generative model for the data according to:

$$P(s_i, c_j) = P(s_i) \sum_{k=1}^{K} P(z_k \mid s_i) P(c_j \mid z_k).$$

Here, the $i^{th}$ segment and $j^{th}$ bin by $s_i$ and $c_j$ are denoted, respectively. A K dimensional latent variable space indexed by the variables $z_k$ is constructed. The distribution of interest is the posterior $P(z_k \mid s_i)$. This distribution is updated in M-step re-estimation and is readily available after the model is learned; it is used as a K element histogram input to the segment clustering process. Throughout, K=9.

For clustering, a nine dimensional latent variable distribution is used for both the motion features and the color features in each motion segment. These features are used to build a $N_S \times N_S$ similarity matrix, where $N_S$ is the number of motion segments. For this process, each latent variable distribution is treated as a histogram, and compared using the Bhattachraya coefficient:

$$d_m(s_i, s_j) = \left(1 - \sum_k \sqrt{P_m(z_k \mid s_i) P_m(z_k \mid s_j)}\right)^{\frac{1}{2}},$$

$$d_c(s_i, s_j) = \left(1 - \sum_k \sqrt{P_c(z_k \mid s_i) P_c(z_k \mid s_j)}\right)^{\frac{1}{2}}.$$

This distance is computed for both the motion and color features using the distributions $P_m(z_k \mid s_i)$ and $P_c(z_k \mid s_i)$ respectively, where the $z_k$ are indices into each respective latent subspace.

A temporal term is added to the similarity measure, which penalizes clusters with segments far apart in time:

$$d_t(s_i, s_j) = \frac{|<s_i> - <s_j>|}{N},$$

where $<s_i>$ is the mean frame number for the $i^{th}$ segment and N is the number of frames in the video. The three distance measures above are combined in a single exponential inter-segment similarity matrix:

$$S_S(i, j) = \exp - \left(\frac{(d_m(s_i, s_j))^2}{2\sigma_m^2} - \frac{(d_c(s_i, s_j))^2}{2\sigma_c^2} - \frac{(d_t(s_i, s_j))^2}{2\sigma_t^2}\right).$$

Here $\sigma_m = \sigma_c = 0.25$ and $\sigma_v$ was set to the average distance in frames between segments 9 segments apart in the source video.

The inter-segment similarity matrix is used, as input to the spectral clustering algorithm. The algorithm has been shown to provide good clustering results for a number of problems and is closely related to many other variations of spectral clustering algorithms. $S_S$ is processed and scaled, and then its eigenvectors are computed. The eigenvalues are used to do a coarse rank estimation, finding the number of eigenvalues that represent 45% of the total energy in the eigenspectrum, and only retaining those. This in turn determines the number of clusters.

For segment clustering, the eigenvectors are clustered using k-means with the number of clusters determined in the rank estimation above. Thus each segment is assigned to a cluster according to its corresponding values in each of the eigenvectors retained.

In summary, this is a principled approach to clustering the segments using motion, color, and temporal information jointly. The framework is flexible to various choices for similarity measures and low-level features. While PLSA and spectral clustering have both been substantially analyzed and rigorously motivated, their application here also introduces a number of parameters which can be expected to impact performance. Some of these variations have been explored, and it is expected that performance could be further enhanced with a more thorough optimization of these parameters.

5.2 Alternative Method

An alternative method was experimented with for clustering the dynamic segments that also qualitatively seemed to create reasonable clusters, although it was not used in the final system. For these experiments, the alternative method used the block histogram feature without any further processing in the clustering; however, other representations, such as a latent variable distribution, could be used. The goal of the variant was to try to identify segments that are similar, but where one segment may not contain the full range of camera motion that another segment contains, e.g., one pan may sweep over a wider angle than another. With this method, each segment is sampled at a fixed rate, e.g., every N frames, where 20 was used. Every sample from one segment is compared against every sample from the other segment. The best matches for each sample in the shorter segment are used to compute a similarity score. This implicitly assumes that the video in the longer segment covers the shorter segment. The similarity score is converted to a distance. In particular, the cosine similarity is used, which ranges between −1 and 1 as the similarity score. It is converted to a distance that ranges between 0 and 1 as:

dist=1.0−(0.5*(cos Sim+1.0))

where cos Sim is the cosine-based similarity.

The distance between each pair of segments is computed to create a distance matrix. Note that since the similarity score is relative to the shorter segment, the distance matrix is diagonally symmetric, and scores only need to be computed for less than half the matrix. The distance matrix was then used in single-link clustering to identify clusters of similar segments. A threshold is used to define the clusters from the cluster tree.

5.3 Static Segment Clustering

In one aspect of the invention, segments that are labeled as static segments are clustered using single-link agglomerative clustering. For features, the average of the block histogram values in each segment is used. Different distance measures, such as Euclidean or one derived from cosine similarity can be used. A few measures were experimented with, and it did not make much difference, compared to type of clustering, so the Euclidean distance was used for simplicity. Time information could be used, but again did not make much of a difference, in comparison to its effect on dynamic segment clustering.

With agglomerative clustering, a method is needed for defining clusters. Two popular methods are to predefine the number of clusters desired or to set a threshold. In this embodiment, a semi-adaptive threshold was used. When there are more than just a few segments (defined as more than 20 in our preferred embodiment), it was noted that some of the segments are usually from the same shot or are a repetition of a shot. The distance between these redundant segments is relatively small, and in a cluster tree, these shots have the lowest height. The height at which each segment is added to the agglomerative tree is put into a list that is sorted. The smallest distances generally correspond to segments from the same shot. Ideally, it would be nice to identify the knee of the sorted list. A cheap approximation to this was used by multiplying the height at the 25th percentile by 1.5. This height is used as the threshold for identifying clusters of similar shots. When there are just a few segments (defined as 20 or less), a fixed threshold is used to define the clusters, since there are too few segments to reliably estimate the distance at which the similar segments are found.

6. Segment Selection

Once the segments have been grouped into clusters, a plurality of segments from the clusters is selected as summary segments. The summary segments are then compiled into a summary video.

6.1 Standard Selection

In one aspect of the invention, in which static and dynamic segments are detected, the dynamic segments are selected, although for other applications, alternate processing is possible. In this embodiment, one representative per cluster of dynamic segments is selected. To select the representative cluster, the similarity between each pair of segments within the current cluster is computed. During the clustering process described above, a similarity matrix is produced using the measure of the single exponential inter-segment similarity matrix, as described above with regard to dynamic segment clustering. This matrix is used to compute an intra-cluster similarity score for the segments $\{s_c: c \in C\}$ for a segment cluster C:

$$Sim(s_c, C) = \frac{1}{|C|} \sum_{\hat{c} \in C} S_S(c, \hat{c})$$

In the same way, the similarity matrix is used to avoid selecting segments that have high similarity with segments that have already been selected for inclusion in the summary. An inter-segment similarity score is computed between candidate segments and those segments $\{s_p: p \in P\}$, where P denotes the index set for previously selected segments in the summary. Finally, the representative segment is selected with index $c^* \in C$ as $$c^* = \underset{c \in C}{\mathrm{argmax}}(Sim(s_c, C) - Sim(s_c, P)).$$

This process is repeated to select one representative segment from each cluster of dynamic segments. In one aspect, the selected segments are included in their entirety up to a maximum duration of six seconds. If the dynamic segment is longer than six seconds, the segment is truncated to remove the beginning of the segment such that six seconds remain. One skilled in the art will appreciate that the selected segment length can be customized depending on user preference or the particular nature of the video being summarized.

After selecting the dynamic segments, static segments are included. In the first step, static segments are removed from consideration if they overlap selected dynamic segments, contain detected clapboards, or belong to unique (singleton) clusters. The remaining static segment clusters are sorted by total duration. Starting from the static segment cluster with the longest total duration and proceeding in descending order, a segment is selected from each cluster. The selection proceeds according to the equation for selecting a representative segment, set forth immediately above, where the similarity matrix used is the same distance matrix (Euclidean distance between average segment block histogram) used for the agglomerative clustering.

In this embodiment, for each selected static segment, a three second excerpt is selected. The segment excerpt is determined using a frame-indexed activity score. The score is computed from the motion features described above. The activity score is computed in two steps: first, the magnitude histogram per frame is integrated against the bin index, and then a 73 frame median filter is applied. Specifically, given the 14 bin magnitude histogram of frame f as $m_f(b), b=1, \ldots, 14$, the inner product is computed $$\hat{m}_f = \sum_{b=1}^{14} (b \cdot m_f(b)).$$

Then the activity score is the output of a median filter applied to this score over the frame range $f-36, \ldots, f+36$. The goal of this score is to exhibit local maxima corresponding to frames with high levels of activity such as when objects or persons enter or exit the frame. The score is finally post-processed to remove peaks near shot boundaries.

For summarization, the three second portion of a selected static segment with the highest average activity score is excerpted. The process is repeated to include additional static segments, possibly excerpting segments from the same cluster, until either all static segments are represented or the maximum summary duration is exhausted.

6.2 Non-Clustered Video Selection

In this embodiment, an attempt was made to automatically detect videos with content that is not amenable to cluster-based summarization. This applied to all videos for which no dynamic segments were detected. If in addition, fewer than 9 static segments are detected, it was assumed that the video contains mostly long static shots. In this case, the summary then consists of three second excerpts taken from the center of each segment. In one aspect, these segments are played back at 1.5 times normal speed to comprise the summaries. This approach generated short summaries that excluded various object-based events that didn't produce appreciable motion. An alternate approach based in uniform sampling from various segments would be an easy way to include more content, even with an overall summary duration constraint. Summary time per segment could be allocated according to the proportion of the source video for which the segment accounts.

7. Summary Presentation

Once the summary segments have been selected, they are compiled into a summary video. In one aspect, the selected segments are ordered by the beginning time of the earliest segment in the cluster to which each selected segment belongs. This is optional, but was done in the present embodiment where there may be multiple shots of a scene that are interleaved with other scenes. The hypothesis was that it would make it easier for the user or evaluator to match the shot or segment against a ground truth list of shots. Probably a more normal ordering is to arrange the summary segments by the beginning time of each segment.

Figure 4:
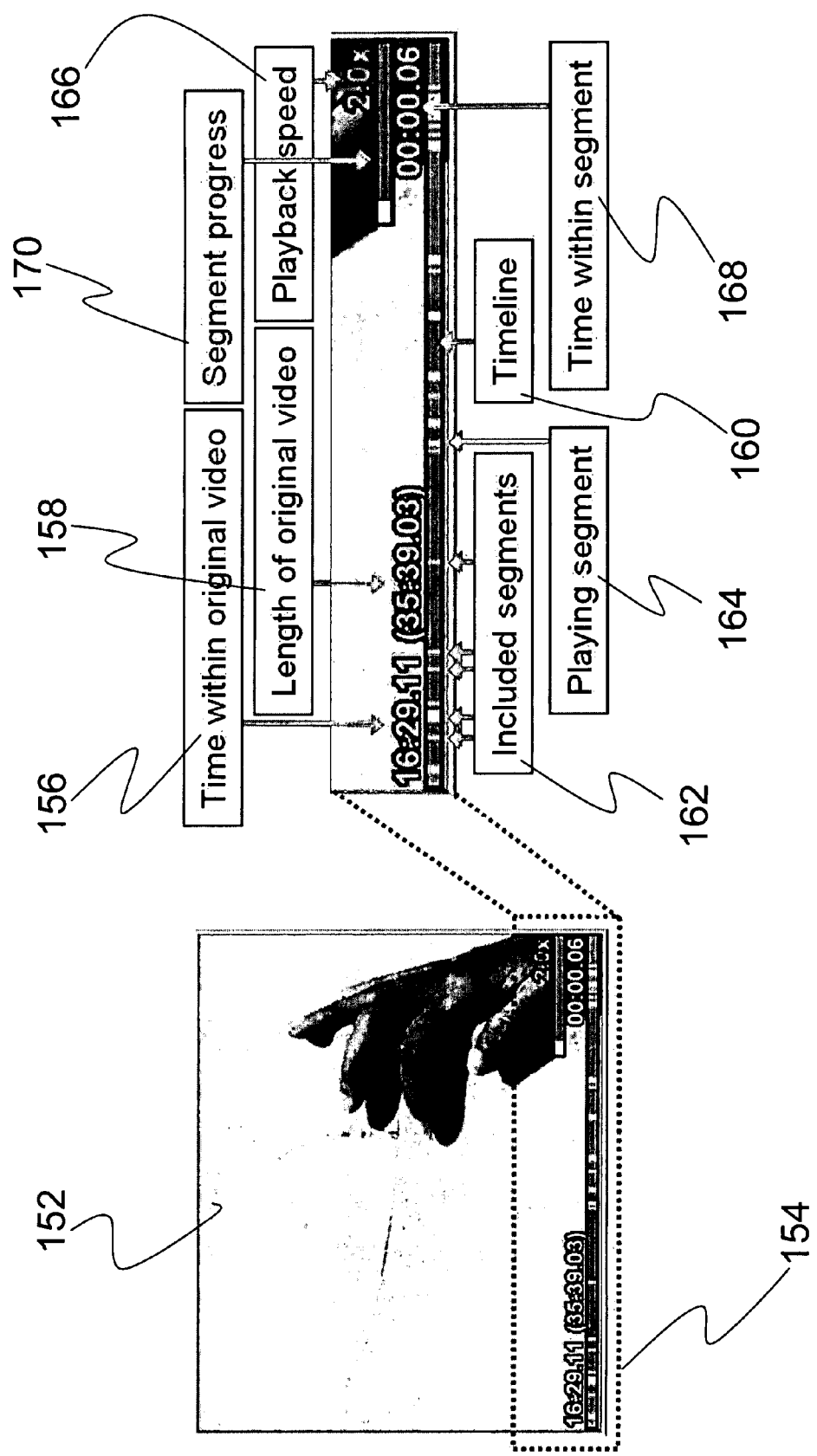
FIG. 4 is an illustration of a video summary presentation, in accordance with one aspect of the present invention.

In one aspect of the invention, when the summary video is rendered, visual cues are overlaid to provide information to the viewer about the context of the summary segments. FIG. 4 illustrates a frame 152 from a video summary showing overlaid timeline 154 and other information. The time of the currently playing segment within the original video 156 is shown alongside the total length of the original video 158. A timeline representing the original video 160 is also shown with shading 162 marking the portions of the original video which are included in the summary. The currently playing segment 164 is highlighted on the same timeline. Also shown are the current playback rate 166 (which may change from segment to segment), the play time of the current segment 168, and a progress bar 170 which indicates what proportion of the current segment has been played.

One skilled in the art will appreciate that a variety of information regarding the summary segments can be displayed in the summary video to aid a user in evaluating the video.

8. Evaluation

In one embodiment of the invention, two baseline systems were defined for evaluation: select 1 second of video every 25 seconds, and cluster shots using k-means clustering on color features into K clusters, where K is equal to the number of seconds of summary, and then selecting the middle second from the shot closest to the centroid of each cluster.

The method of the present embodiment is closer to baseline 2, but differs in a number of ways. The method of this embodiment performs a finer segmentation that segments video based on color and separately segments video based on motion. Currently, this system segments camera motion based on the gross pan and zoom motion features, but if more detailed motions are desired in the summary, finer segmentation of the color-based and camera-motion-based segments could be performed based on the motion histograms. Rather than performing a single clustering of all segments, the segments with camera motion are clustered separately from segments where the camera is relatively stationary, so that different features and similarity measures can be used. In addition, the system allows the user to specify preferences for selecting representative segments with camera motion and representative stationary segments that contain object motion. It also uses audio information, processes the audio in sped up segments to restore the pitch, and presents metadata in the summary for indexing back to the original video.

The system creates one type of summary that can be quickly played. There are other types of summaries that can be created, including ones for specific genres, such as sports or broadcast news.

Various aspects of the present invention, whether alone or in combination with other aspects of the invention, may be implemented in C++ code running on a computing platform operating in a LSB 2.0 Linux environment. However, aspects of the invention provided herein may be implemented in other programming languages adapted to operate in other operating system environments. Further, methodologies may be implemented in any type of computing platform, including but not limited to, personal computers, mini-computers, mainframes, workstations, networked or distributed computing environments, computer platforms separate, integral to, or in communication with charged particle tools, and the like. Further, aspects of the present invention may be implemented in machine readable code provided in any memory medium, whether removable or integral to the computing platform, such as a hard disc, optical read and/or write storage mediums, RAM, ROM, and the like. Moreover, machine readable code, or portions thereof, may be transmitted over a wired or wireless network.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting.

What is claimed is:

1. A system for summarizing a video, comprising:
receiving an input video signal;
extracting a plurality of features from the video, wherein
separating the video into a first set of segments based upon a first feature of the plurality of features; wherein each segment is separated based on the first feature of the plurality of features;
separating the video into a second set of segments based upon a second feature of the plurality of features; wherein each segment is separated based on the second feature of the plurality of features;
classifying the video segments based upon the plurality of features; wherein at least one of the first and second sets of segments is classified based on both the first feature and the second feature of the plurality of features;

grouping similarly classified video segments into clusters selecting a plurality of segments from the clusters to comprise summary segments; and compiling the summary segments into a summary video.

2. The system of claim 1, wherein the plurality of features extracted is based on motion and appearance.

3. The system of claim 2, wherein the appearance features are a color histogram for each frame of a video segment.

4. The system of claim 2, wherein the motion feature includes the type of camera motion in a video segment.

5. The system of claim 4, wherein the type of camera motion is a camera pan or a camera zoom.

6. The system of claim 2, wherein the plurality of features extracted includes features derived from the audio.

7. The system of claim 6, wherein the audio features extracted are used to separate the video into video segments based on sound.

8. The system of claim 2, wherein the motion and appearance features extracted are used to separate the video into segments that have similar appearance features and motion features.

9. The system of claim 8, wherein the separation of video into segments based on appearance features and the separation of video into segments based on motion features are carried out separately.

10. The system of claim 1, wherein the video segments are classified as dynamic video segments, static video segments, or ignored video segments.

11. The system of claim 10, wherein the classifying of video segments includes combining the segments separated based on appearance features and the segments separated based on motion features.

12. The system of claim 11, wherein the dynamic video segments and static video segments are grouped into clusters separately.

13. The system of claim 12, wherein the dynamic video segments are grouped into clusters using both appearance features and motion features.

14. The system of claim 13, wherein the grouping of dynamic video segments into clusters includes dimension reduction and spectral clustering.

15. The system of claim 14, wherein the static video segments are grouped into clusters using appearance features.

16. The system of claim 15, wherein the grouping of static video segments into clusters uses agglomerative clustering.

17. The system of claim 1, wherein a similarity matrix is calculated for all video segments in the clusters.

18. The system of claim 17, wherein the selecting of a plurality of video segments from the clusters to comprise summary segments is calculated based on the similarity matrix.

19. The system of claim 18, wherein one video segment per cluster is selected to comprise the summary segments.

20. The system of claim 1, wherein the summary segments are compiled in order by the beginning time of each segment, such that the summary video is in temporal order.

21. The system of claim 1, wherein the summary video further includes information displayed to a user regarding the summary segments.

22. A system for summarizing a video, comprising:

receiving an input signal of a video;

extracting a plurality of features from the video, wherein the features include motion and appearance;

creating a first set of video segments based on the motion features and creating a second set of video segments based on the appearance features;

classifying at least one of the first and second sets of video segments based upon the both motion and appearance features, wherein the video segments are classified as dynamic video segments, static video segments, or ignore video segments;

grouping similarly classified video segments into clusters, wherein the dynamic video segments and static video segments are clustered separately;

selecting a plurality of segments from the clusters to comprise summary segments, wherein one video segment from each cluster is selected; and compiling the summary segments into a summary video, wherein the summary video also includes data relating to the selected summary segments in relation to the video.

* * * * *